A. O. WHITE.
MACHINE FOR BURNING IN BEARINGS AND LIMBERING UP MOTORS.
APPLICATION FILED OCT. 8, 1919.
1,348,611.
Patented Aug. 3, 1920.
2 SHEETS—SHEET 1.
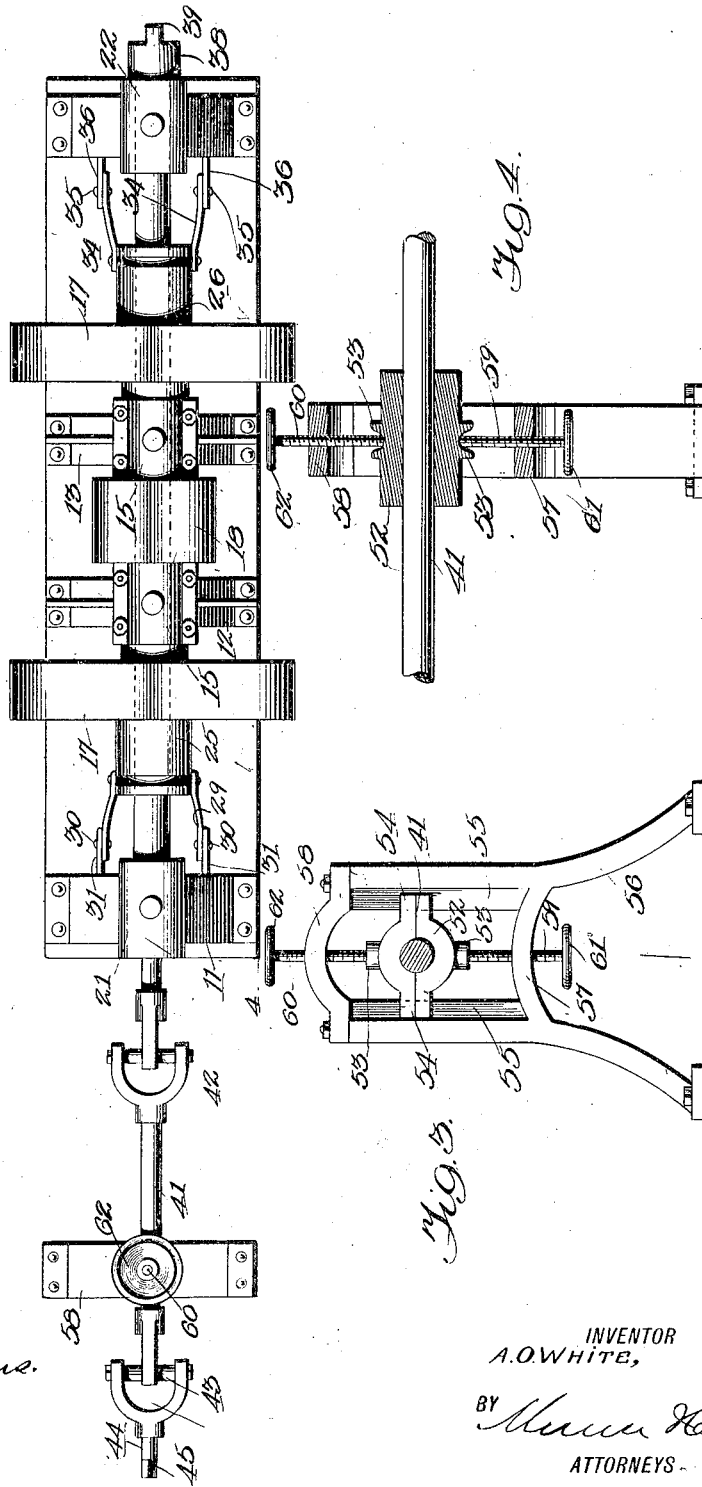
WITNESSES
George G. Myers.
INVENTOR
A. O. WHITE,
BY
ATTORNEYS A. O. WHITE.
MACHINE FOR BURNING IN BEARINGS AND LIMBERING UP MOTORS.
APPLICATION FILED OCT. 8, 1919.
1,348,611.
Patented Aug. 3, 1920.
2 SHEETS—SHEET 2.
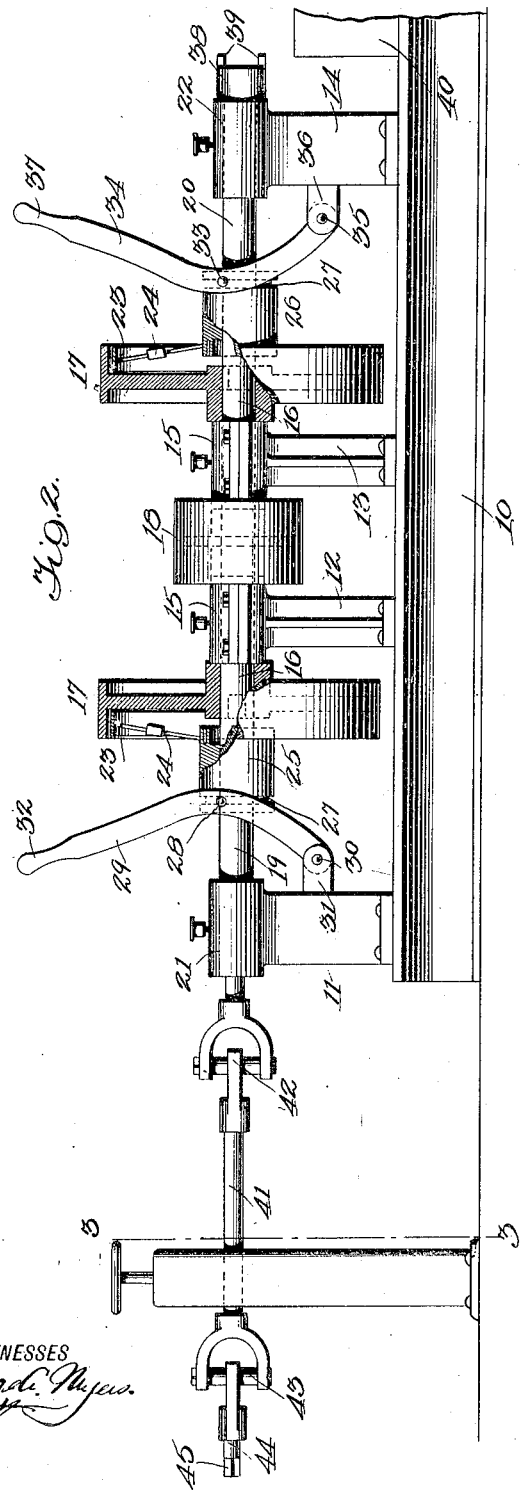
WITNESSES
INVENTOR
A. O. WHITE,
BY
ATTORNEYS

UNITED STATES PATENT OFFICE.

ADDISON O. WHITE, OF HIGH POINT, NORTH CAROLINA.

MACHINE FOR BURNING IN BEARINGS AND LIMBERING UP MOTORS.

1,348,611.  Specification of Letters Patent.  Patented Aug. 3, 1920.

Application filed October 8, 1919. Serial No. 329,356.

*To all whom it may concern:*

Be it known that I, ADDISON O. WHITE, a citizen of the United States, and a resident of High Point, in the county of Guilford and State of North Carolina, have invented certain new and useful Improvements in Machines for Burning in Bearings and Limbering Up Motors, of which the following is a specification.

My present invention relates generally to machines for burning in bearings and limbering up motors, and more particularly to an arrangement for rotating the crank shafts of automobile motors, and my object is the provision of an arrangement adapted alike to motor blocks removed from their supports, as well as to the crank shafts of automobiles complete and ready for operation.

In applying new bearings to an automobile motor, or in tightening up old bearings, it often becomes a very difficult matter to rotate the crank shaft unless the bearings have been carefully scraped to an exact fit when they are installed and as this scraping and proper fitting of bearings is a lengthy, tedious hand operation, it is infrequently done and the more or less rough bearings are as a usual rule inserted or tightened and then by turning the crank shaft a gradual wearing takes place by virtue of the comparatively soft material of the bearing against the surface of the relatively harder crank shaft.

In doing this however, and by virtue of the comparatively rough bearings with several longitudinally spaced points of the crank shaft, it is frequently found impossible to turn the crank shaft by hand and not infrequently found impossible to rotate the crank shaft with the usual electrical or mechanical starting device.

Arrangements have been before proposed for rotating crank shafts of dis-mantled motor blocks, whose nature requires the application and use of considerable power for this purpose, and my invention, proceeding beyond this point as it does, proposes an apparatus not only applicable to dismantled motor blocks, but which may also be associated with the crank shaft of an automobile as the latter stands ready for operation in its complete form, and aims to permit stuck bearings to be broken out and worn in with the expenditure of minimum power and materially less power than is now required for effective operation upon motor blocks alone.

It is to be appreciated furthermore that while my invention as thus stated is primarily intended for the burning in of bearings, it may be applied to the limbering up of motors, particularly those which are notoriously hard to start after removal and replacement of cylinder heads, as well as in instances of "seized" pistons, and my invention is thus directed to a machine capable of effective and frequent use both in garages and automobile service stations, as well as in private.

In the accompanying drawings which illustrate my present invention and form a part of this specification, Figure 1 is a top plan view of my improved apparatus, Fig. 2 is a side view partly in elevation and partly broken away and in section, Fig. 3 is a vertical transverse section taken substantially on line 3—3 of Fig. 2, Fig. 4 is a vertical longitudinal section taken substantially on line 4—4 of Fig. 3, Fig. 5 is a side view of the adjusting shaft bearing, Fig. 6 is a side view of one of the detachable interchangeable crank shaft engaging pieces, and Fig. 7 is detail perspective view of another of the crank shaft engaging pieces.

Referring now to these figures my invention proposes an apparatus including a stationary base 10 provided at longitudinally spaced points with upright supports 11, 12, 13 and 14, the supports 12 and 13 of which have a somewhat central location on the base 10 and support upper bearings 15 for a main driven shaft 16 whose ends project beyond the bearings 15 and are provided with rigid balance or fly wheels 17. On the main shaft 16 between the bearing 15 is a pulley 18 which receives a belt leading from an electric or other motor from which shaft 16 receives its power.

In its opposite ends shaft 16 has axial bores receiving the end projections of a pair of axially alined extension shafts 19 and 20, the outer portions of which are respectively journaled in upper bearings 21 and 22 of the upright supports 11 and 14.

The balance or fly wheels 17 at opposite ends of the main shaft 16 have relatively wide flanges, the outer portions of which form inner clutch surfaces for engagement by annular clutch members or bands 23, each controlled through adjustable arms 24 from a lengthwise movable clutch sleeve, one of which is indicated at 25 and is splined upon the inner portion of the extension shaft 19 and the other of which is indicated at 26 and is similarly splined upon the inner portion of extension shaft 20.

The clutch sleeves 25 and 26 have annular grooves 27, the groove of sleeve 25 being engaged by the inwardly projecting pins 28 of a controlling lever 29 whose lower bifurcated portions are pivoted at 50 upon extensions 31 of the upright support 11 and at whose upper end is a handle 32.

The groove 27 of clutch sleeve 26 is similarly engaged by inwardly projecting pins 23 of a controlling lever 34 whose lower bifurcated portions are pivoted at 35 upon extensions 36 of the support upright 14 and at whose upper end is a handle 37.

At its outer end, beyond the bearing 22, shaft 20 has an enlarged head 38 provided with projecting pins 39 for engagement with crank shaft carried portions of the motor block of a Ford automobile when said motor block is disposed upon a motor block support partially seen at 40 in Fig. 2 and mounted upon the base 10.

At the outer end of extension shaft 19, beyond the bearing 21, is an adjusting shaft 41 having at one end a universally movable connection 42 with the shaft 19 and having at its opposite end a universally movable connection 43 with a stub shaft 44 provided with a squared free end 45 so as to thus adapt the same to interchangeable reception of crank shaft engaging members of the nature shown in Figs. 6 and 7.

The crank shaft engaging member 46 of Fig. 6 is shown as provided with a clutch face 47 at one end and a squared bore 48 at its opposite end, the latter of which slidably and removably receives the squared extremity of the stub shaft 45.

On the other hand the engaging member 49 of Fig. 7 has its tubular crank shaft receiving end provided with a diametrically placed pin 50 for engagement with a diametrically slotted crank shaft, its opposite end having a squared bore 51 to receive the squared extremity 45 of stub shaft 44.

It is further to be understood that other forms of crank shaft engaging members may be provided and adapted to my improved apparatus as long as they have a squared bore at one end.

The adjusting shaft 41 passes at a point intermediate its ends through a bearing 52 having, as particularly seen in Fig. 5, diametrically opposed upper and lower lugs 53 and also provided with laterally projecting and longitudinally spaced side guides 54 whose inner opposing surfaces are curved as shown, to receive between them upright intermediate guide ribs 55, of a bearing bracket 56, the side legs of which have a lower connecting cross bar 57 below the adjusting shaft 41 and an upper cross piece 58 above the adjusting shaft.

Through these cross pieces 57 and 58 are adjustably threaded screw bars 59 and 60, the former having a lower handle 61 and the latter having an upper handle 62. The inner ends of these screw bars 59 and 60 engage the diametrically opposite lugs 54 of the bearing member 52, so that the latter may be shifted upwardly and downwardly in order to bring the outer stub shaft 44 into the same horizontal plane with the crank shaft of an automobile, the angular disposition of adjusting shaft 41 between its universally movable connections 42 and 43 being permitted by virtue of the inner curved engaging faces of the side projections 54 of the bearing 52.

In operation, it is obvious that either one or both of the extension shafts 19 and 20 may be utilized, and that while capable of use at the same time, either of these shafts when utilized independently obtains the benefit of both of the balance or fly wheels 17 which also act as clutch surfaces.

Thus, if the work in hand is a motor block apart from an automobile, such motor block is disposed upon the support 40 and its crank shaft engaged by the head 38 of shaft 20 so that with the main shaft 16 connected to its source of power, clutch lever 34 is operated to bring about transmission of this power to the shaft 20.

If, however, the work in hand be a motor in connection with an automobile complete, the machine is propelled up to the opposite end of the apparatus and the adjusting shaft 41 adjusted to the height of the crank shaft. One of the crank shaft engaging members for instance, either the member 46 of Fig. 6 or member 49 of Fig. 7, is disposed on stub shaft 44 and also into engagement with the motor crank shaft and clutch lever 29 is manipulated to bring about transmission of power from the main shaft 16 to the extension shaft 19, during which transmission of power shaft 19 will obtain the benefits of inertia of both of the fly wheels 17, just as previously the shaft 20 had the benefit of both of these fly wheels.

It is therefore obvious that with its use in connection with the burning in of motor bearings in particular, my improved machine will allow of the disposition of more or less rough bearings in place and may be operated to bring about rotation of the crank shaft, with these bearings tightened, over a period of time required to soften the bearings and allow the latter to properly fit themselves around the crank shaft, which constitutes the burning in operation. Thus afterward with the motor limbered up and ready for normal operation, it will simply be necessary to clean out the oil grooves of the burnt in bearings. It is also obvious that by virtue of its particular construction, including the main shaft employing two fly wheels acting also as clutch members, and the inertia developed by these two fly wheels and transmitted to either of the extension shafts, I will be able to accomplish the desired results with minimum power.

I claim:—

1. An apparatus of the character described, including a support, a main shaft journaled on the support, and having a driven pulley intermediate its ends, fly wheels adjacent to the ends of the main shaft, a pair of extension shafts co-axial with, and at opposite ends of, the main shaft, clutch members carried by the extension shafts and movable into and out of engagement with the said fly wheels, and crank shaft engaging means carried by the said extension shafts.

2. An apparatus of the character described, including a support, a main shaft journaled on the support and having a driven pulley intermediate its ends, fly wheels adjacent to the ends of the main shaft, a pair of extension shafts co-axial with, and at opposite ends of, the main shaft, clutch members carried by the extension shafts and movable into and out of engagement with the said fly wheels and crank shaft engaging means carried by the said extension shafts, one of said crank shafts having vertically adjustable means supporting its said crank shaft engaging means, as described.

3. An apparatus of the character described, comprising a main driven shaft, oppositely disposed extension shafts axially alined with the main shaft, a pair of fly wheels secured to the main shaft, clutch members carried by the extension shafts and movable into and out of engagement with the said fly wheels, and crank shaft engaging means carried by said extension shafts.

4. An apparatus of the character described, comprising a main driven shaft, an extension shaft, clutch connections between the main shaft and the extension shaft, and crank shaft engaging means carried by and vertically adjustable with respect to said extension shaft, as described.

5. An apparatus of the character described, comprising a main driven shaft, an extension shaft, a clutch connection between the said shafts, and crank shaft engaging means carried by the extension shaft, including a vertically movable adjusting shaft, as described.

6. An apparatus of the character described, including an adjusting shaft, crank shaft engaging means having a movable connection with said adjusting shaft, and power transmitting devices with which the said adjusting shaft has a universally movable connection.

7. An apparatus of the character described, including an adjusting shaft, crank shaft engaging means having a universally movable connection with said adjusting shaft, and a power transmitting device with which the said adjusting shaft has a universally movable connection, said power transmitting device including a manually operable clutch for the purpose described.

8. An apparatus of the character described, including a main shaft, an extension shaft, a clutch for connecting said shafts, a vertically movable adjusting shaft having a universally movable connection with the extension shaft, a stub shaft having a universally movable connection with the adjusting shaft, and a crank shaft engaging element carried by the stub shaft.

9. An apparatus of the character described, including a main shaft, an extension shaft, a clutch for connecting said shafts, a vertically movable adjusting shaft having a universally movable connection with the extension shafts, a stub shaft having a universal movable connection with the adjusting shaft, said stub shaft having a squared free end, and a crank shaft engaging element having a squared bore to receive the square end of the stub shaft in detachable relation, as described.

ADDISON O. WHITE.